(12) United States Patent
James (10) Patent No.: US 8,938,844 B1
(45) Date of Patent: Jan. 27, 2015

(54) VEHICLE AND UTILITY DRYING CLOTH

(71) Applicant: Randy W. James, Lee's Summit, MO (US)

(72) Inventor: Randy W. James, Lee's Summit, MO (US)

( * ) Notice: Subject to any disclaimer, the term of this patent is extended or adjusted under 35 U.S.C. 154(b) by 0 days.

(21) Appl. No.: 14/081,557

(22) Filed: Nov. 15, 2013

(51) Int. Cl.
*A47L 13/20* (2006.01)
*B60S 3/00* (2006.01)
*F26B 5/16* (2006.01)

(52) U.S. Cl.
CPC .. *B60S 3/002* (2013.01); *F26B 5/16* (2013.01)
USPC ............................. 15/244.3; 15/228; 15/247

(58) Field of Classification Search
USPC ......................................... 15/228, 247, 244.3
See application file for complete search history.

(56) References Cited

U.S. PATENT DOCUMENTS

| | | | | |
|---|---|---|---|---|
| 960,158 | A * | 5/1910 | Cummings et al. ............ | 15/247 |
| 2,858,559 | A * | 11/1958 | Carlson, Sr. ................... | 15/247 |
| 3,166,775 | A * | 1/1965 | Cushman ........................ | 15/228 |
| 3,380,504 | A * | 4/1968 | Green ............................. | 15/247 |
| 4,114,223 | A * | 9/1978 | Buchanan ...................... | 15/228 |
| 4,785,934 | A * | 11/1988 | Hogle ....................... | 206/315.11 |
| 4,823,427 | A * | 4/1989 | Gibbs et al. .................... | 15/247 |
| 5,042,105 | A * | 8/1991 | Buck et al. ..................... | 15/247 |
| 5,177,831 | A * | 1/1993 | Wirth ........................... | 15/244.3 |
| 6,389,637 | B1 * | 5/2002 | Hurell ............................ | 15/247 |
| 6,836,923 | B2 * | 1/2005 | Treacy et al. ................ | 15/229.8 |
| 7,451,516 | B2 * | 11/2008 | Tanaka ............................ | 15/228 |
| 8,060,973 | B2 * | 11/2011 | Wildeman et al. .......... | 15/209.1 |
| 8,250,700 | B2 * | 8/2012 | Pung et al. ..................... | 15/228 |
| 8,266,756 | B1 * | 9/2012 | Kovarik ...................... | 15/210.1 |
| 2008/0169052 | A1 * | 7/2008 | Tannijarvi et al. ............ | 150/154 |
| 2009/0144926 | A1 * | 6/2009 | Fava .............................. | 15/228 |

* cited by examiner

*Primary Examiner* — Monica Carter
*Assistant Examiner* — Michael Jennings
(74) *Attorney, Agent, or Firm* — Hovey Williams LLP (57) ABSTRACT

A drying cloth for drying a large vehicle or structure. The drying cloth may be made of absorbent fabric sewn to form a fabric shell with a hollow center extending between a first and a second opening. The drying cloth may also have a pole opening formed therethrough mid-way between the first opening and the second opening and a first seam edge and a second seam edge extending between the pole opening and the second opening to cooperatively form an openable seam. The openable seam may be placed in an attached and an unattached configuration via attaching and detaching attachment devices of the drying cloth. The drying cloth may be attachable to a cleaning tool having an elongated handle and an end fixture attached to the handle. The elongated handle may fit through the pole opening and the drying cloth is sized to loosely fit over the end fixture.

21 Claims, 6 Drawing Sheets

VEHICLE AND UTILITY DRYING CLOTH

BACKGROUND

Absorbent cloths made of micro-fiber, chamois, and other materials are often used to dry and shine vehicles and boats to a spot-free finish. The use of conventional hand-held drying cloths generally involves a user bending, stooping, kneeling, stretching, and/or climbing, particularly when cleaning, drying, or polishing hard-to-reach areas on boats, recreational vehicles, windows, walls, and siding. This can be cumbersome for the user and even dangerous in some instances.

Therefore, there is a need for an apparatus and method for safer and efficient cleaning, drying, and/or polishing boats and various other vehicles and structures.

SUMMARY

Embodiments of the present invention solve the above-mentioned problems and provide a distinct advance in the art of drying or polishing difficult-to-reach surfaces. Specifically, embodiments of the present invention provide a drying cloth for drying hard-to-reach areas such as boats and other large vehicle or structures. The drying cloth is designed to quickly and easily fit over a brush or squeegee attached to a long pole or handle so that the brush or squeegee supports the drying cloth and the long pole or handle allow a user to position the drying cloth against surfaces to be dried. The drying cloth is also sized to loosely fit over the brush or squeegee to provide a greater amount of surface area for absorbing liquid when drying the surface.

In more detail, the drying cloth may be made of absorbent fabric wrapped and/or sewn to form a flexible shell with a hollow center and first and second openings. The drying cloth may also have a pole opening formed through the shell midway between the first opening and the second opening, as well as a first seam edge and a second seam edge formed in the shell between the pole opening and the second opening to cooperatively form an openable seam. The openable seam may be closed by Velcro, zippers, or other closure elements on the drying cloth.

The drying cloth or shell may be attached to a cleaning tool having an elongated handle and an end fixture attached to the handle, such as a long-handled brush or squeegee. The end fixture is inserted inside the cloth and the elongated handle fits through the pole opening.

A method of drying a large vehicle or structure using the drying cloth may include the steps of placing the openable seam in the unattached configuration, inserting the end fixture through the second opening of the drying cloth, and moving the handle between the first and second seam edges until the handle reaches the pole opening. Next, the method may include the steps of placing the openable seam in the attached configuration, grasping the handle of the cleaning tool, and contacting a surface of the large vehicle or structure with the drying cloth via actuation of the handle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention is intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the present invention is defined only by claims presented in subsequent regular utility applications, along with the full scope of equivalents to which such claims are entitled.

In this description, references to "one embodiment," "an embodiment," or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, step, etc. described in one embodiment may also be included in other embodiments, but is not necessarily included. Thus, the present technology can include a variety of combinations and/or integrations of the embodiments described herein.

Figures 1, 2:
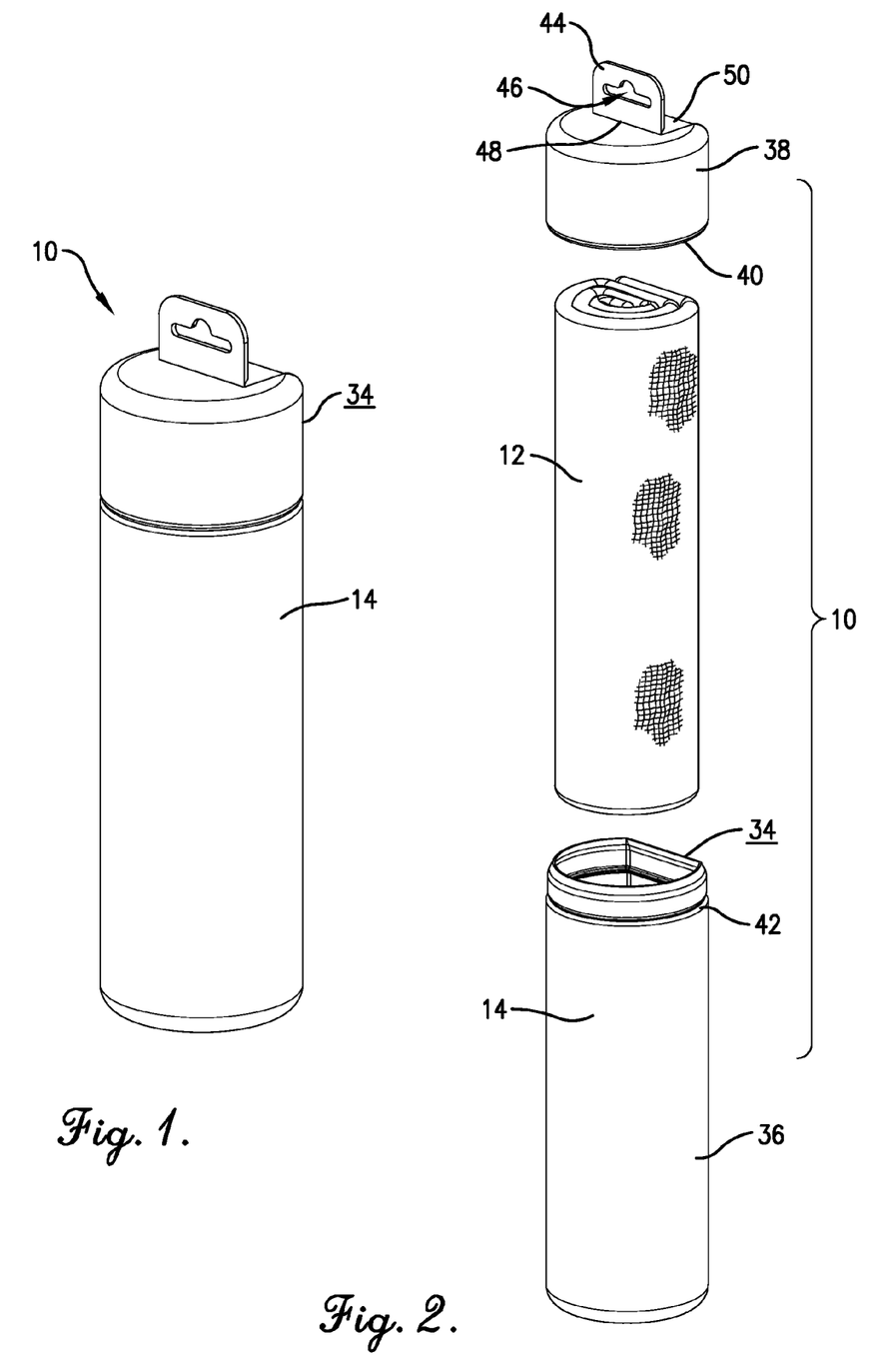
FIG. 1 is a perspective view of a drying system constructed in accordance with an embodiment of the present invention.
FIG. 2 is an exploded perspective view of the drying system of FIG. 1, illustrating both a storage container and a drying cloth of the drying system, with the drying cloth rolled up for storage within the storage container.
Figure 3:
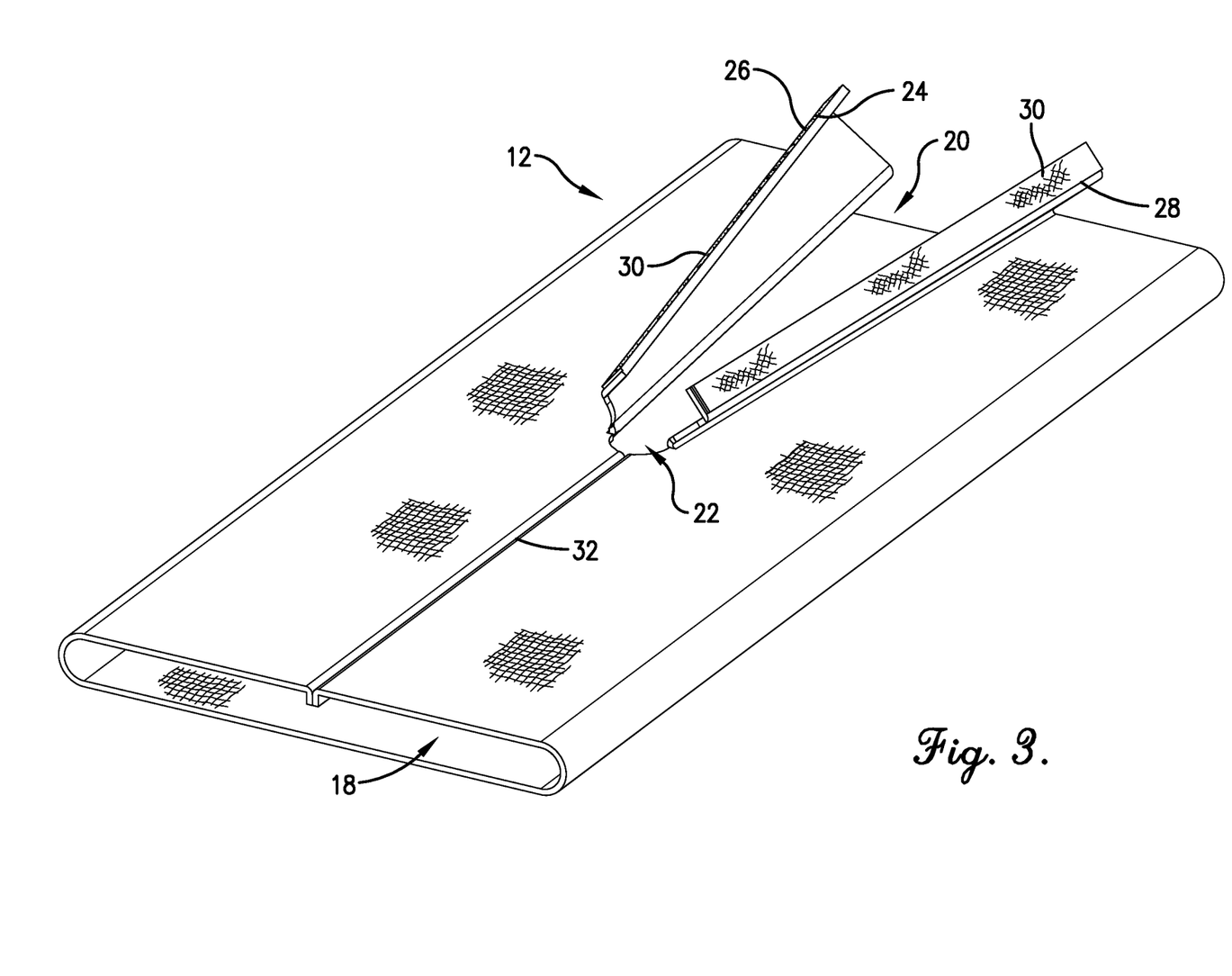
FIG. 3 is a perspective view of the drying cloth of FIG. 2 illustrating an openable seam thereof in an unattached configuration.
Figure 4:
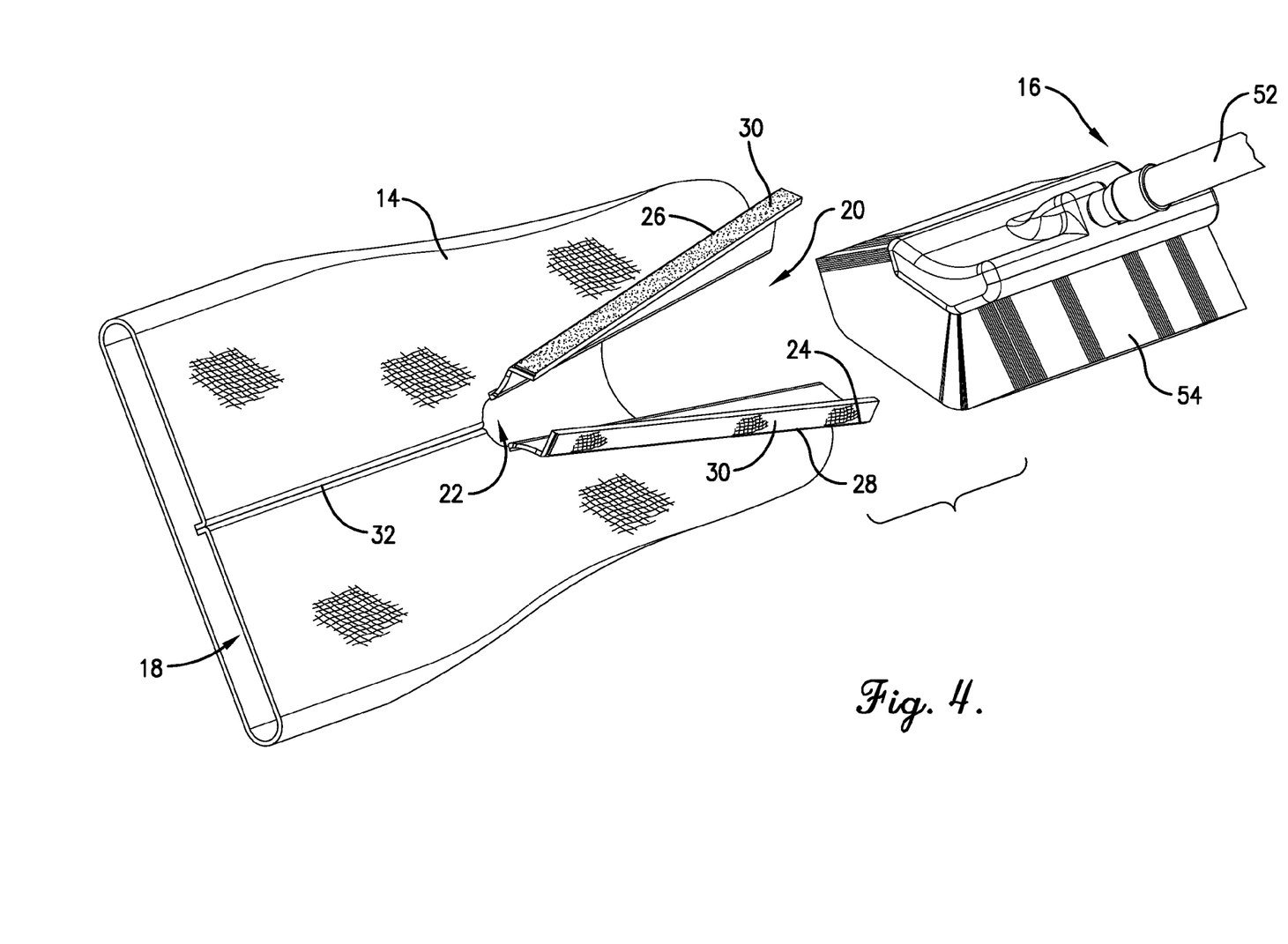
FIG. 4 is a perspective view of the drying cloth of FIG. 3 and a fragmentary perspective view of a cleaning tool to which the drying cloth may be attached.
Figure 5:
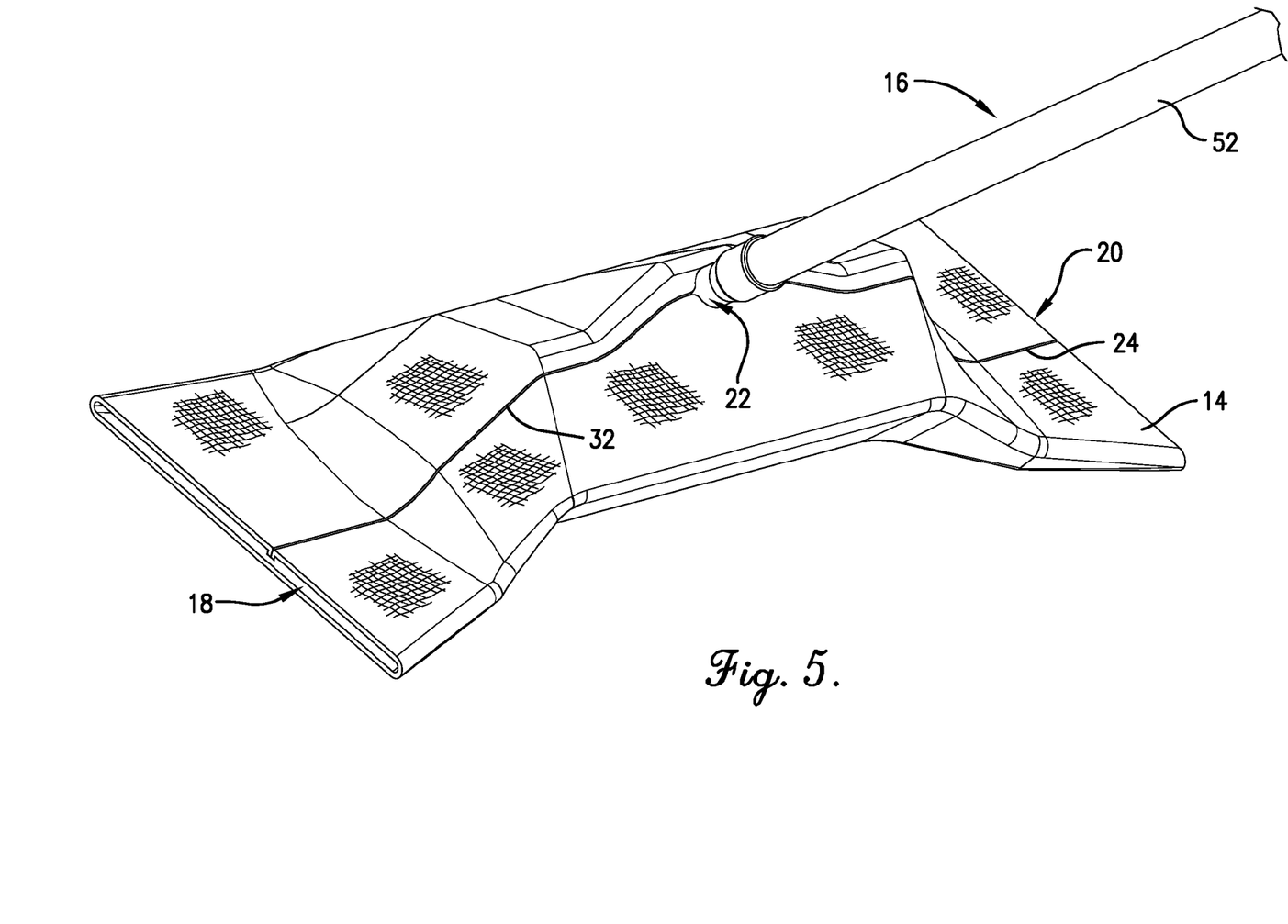
FIG. 5 is a fragmentary perspective view of the cleaning tool of FIG. 4 and the drying cloth attached over an end fixture of the cleaning tool, with the openable seam in an attached configuration.
Figure 6:
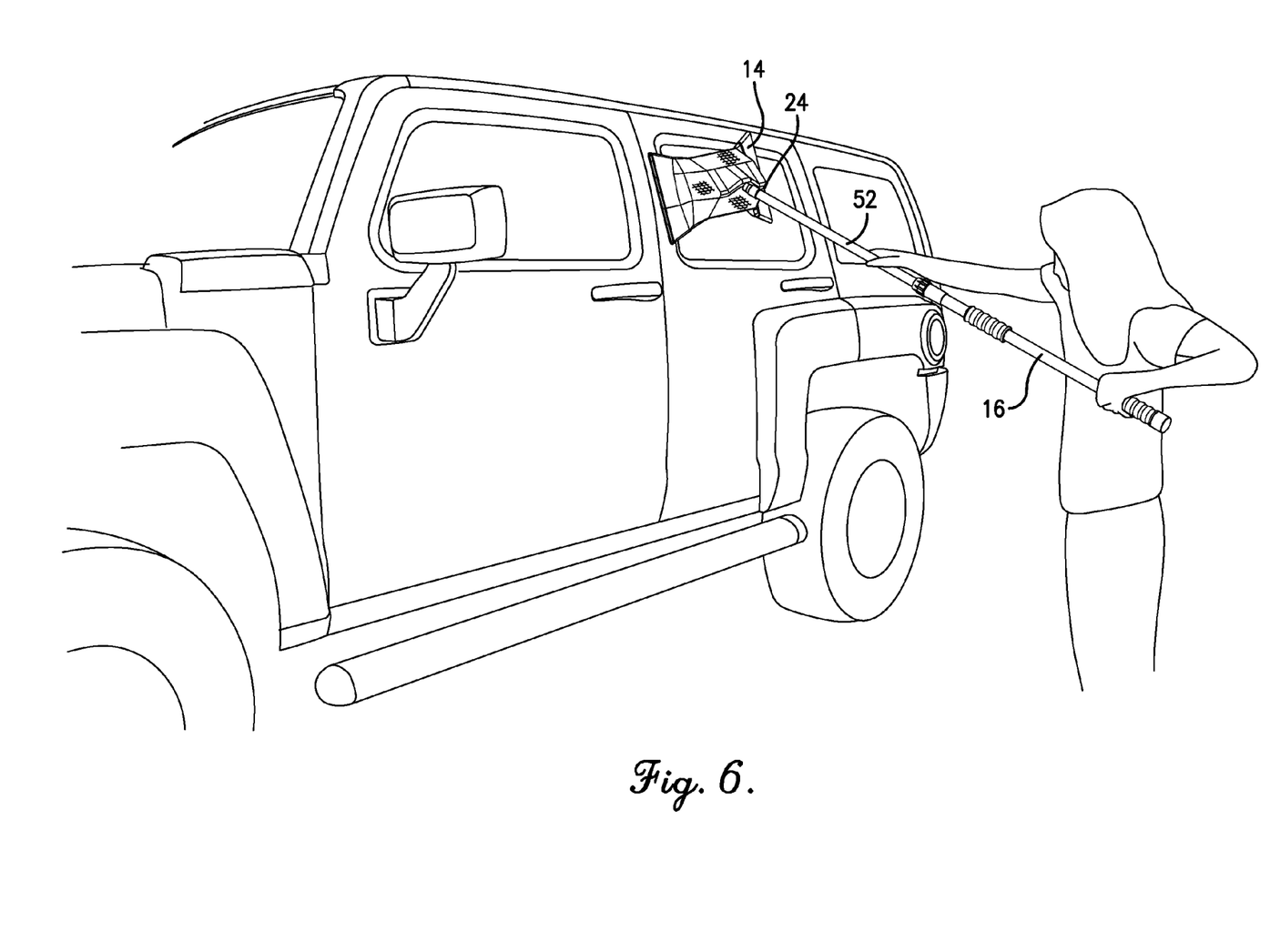
FIG. 6 is an environmental perspective view of the drying cloth and cleaning tool of FIG. 5 being used to dry a window of a vehicle.

As illustrated in FIGS. 1-6, a drying system 10 is disclosed herein for cleaning, drying, and/or polishing various vehicles and structures. The drying system 10 may comprise a drying cloth 12 and a storage container 14 sized and shaped for storing the drying cloth 12 therein, as illustrated in FIGS. 1-2. The drying cloth 12 may be configured for attachment to variety of cleaning tools having elongated handles, such as long-handled brushes, boat deck brushes, sponge mops, squeegees, and the like. Alternatively, the drying system 10 may comprise a cleaning tool 16 configured for attachment to the drying cloth 12, as illustrated in FIGS. 4-6.

The drying cloth 12 may be made of any fabric. In particular, the drying cloth 12 may be made of absorbent cloth, such as micro-fiber cloth and/or natural or synthetic chamois material. However, any absorbent cloth may be used without departing from the scope of the invention. The drying cloth 12 may be wrapped or sewn to form a flexible shell, such as a substantially tubular or cylindrical flexible shell. For example, the shell may have a hollow center and two opposing open ends. In one embodiment of the invention, the drying cloth or shell may be manufactured by sewing or otherwise attaching opposing side edges of a rectangular cloth together, forming a seam. However, in other embodiments of the invention, this tubular or cylindrical shaped shell may be formed without this seam, using known methods of manufacturing seamless tubular or cylindrical fabric articles, such as clothing and the like.

As illustrated in FIG. 3, the drying cloth 12 or shell may be substantially rectangular or square when lying flat, but substantially cylindrical when held in an expanded position. In one example embodiment of the invention, the drying cloth 12 or shell may have dimensions of 12-inches by 26-inches when lying flat, and may have 624 square inches of surface area. Preferably, the dimensions of the drying cloth 12 are such that the drying cloth or shell may fit over an end fixture of a long-handled brush, boat deck brush, sponge mop, squeegee, or the like. More specifically, the dimensions of the drying cloth 12 are preferably substantially greater than the maximum dimensions of the end fixtures of typical long-handled brushes, boat deck brushes, sponge mops, squeegees, and the like, so that portions of the drying cloth 12 freely hang and are freely movable against surfaces of various vehicles and structures, independent of the end fixture over which the drying cloth 12 is placed. However, the drying cloth 12 may have any dimensions without departing from the scope of the invention.

As illustrated in FIGS. 3 and 4, the drying cloth 12 or shell may have a first opening 18 and a second opening 20 at an opposite end of the drying cloth 12 relative to the first opening 18. Furthermore, the drying cloth 12 may have a pole opening 22 formed substantially mid-way between the first opening 18 and the second opening 20. The pole opening 22 may be sized and configured to accommodate a variety of poles or handles, such as the handle of the cleaning tool 16 or a handle of other items, such as the long-handled brushes, boat deck brushes, sponge mops, and squeegees noted above. For example, the pole opening 22 may be circular.

The drying cloth 12 may also comprise an openable seam 24 extending length-wise along the drying cloth 12 from the first or second openings 18,20 to the pole opening 22 and configured to be in an attached configuration, as illustrated in FIGS. 5 and 6, and an unattached configuration, as illustrated in FIGS. 3 and 4. For example, the openable seam 24 may include a first seam edge 26 and a second seam edge 28 configured to mate with a portion of the drying cloth 12 at or proximate to the first seam edge 26. The openable seam 24 may further comprise attachment devices 30 such as opposing pieces of VELCRO (sometimes generically known as hook and loop tape or hook pile tape), zippers, buttons and button holes or loops, opposing snaps, or any other openable attachment devices. The attachment devices 30 may be positioned at or proximate to the first and second seam edges 26,28. In some embodiments of the invention, a substantially permanent seam 32 (such as a sewn seam) may extend between the first opening 18 and the pole opening 22, while the openable seam 24 extends between the second opening 20 and the pole opening 22. However, in other alternative embodiments of the invention, a first openable seam may extend between the first opening and the pole opening and a second openable seam may extend between the second opening and the pole opening.

The storage container 14, as illustrated in FIG. 2, may be substantially cylindrical in shape, with the exception of one flattened surface 34 extending between two opposing closed ends thereof. The storage container 14 may be separatable into a first portion 36 and a second portion 38 configured to detachably engage with each other to form the storage container 14. The storage container 14 may be sized and shaped such that the drying cloth 12 may fit therein when rolled up. The storage container 14 may be made of plastic or any other suitable flexible and/or water-proof material.

In one embodiment of the invention, the first portion 36 of the storage container 14 is substantially longer than the second portion 38 of the storage container 14. The second portion 38 of the storage container 14 may be referred to herein as the lid of the storage container 14. Furthermore, in some embodiments of the invention, the second portion 38 of the storage container 14 comprises a closed end and an open end opposite the closed end. The storage container 14 may further comprise a lip 40 formed at or proximate to the open end of the second portion 38 of the storage container 14. The lip 40 may extend substantially inward relative to a center axis extending length-wise through the storage container 14.

Likewise, the first portion 36 of the storage container 14 may have a closed end and an open end opposite the closed end. A groove 42 may be formed into the first portion 36, proximate to the open end thereof. The groove 42 may be sized and configured to receive the lip 40 of the second portion 38 of the storage container 14. Because of the give or flexure of the plastic, the lip 40 may slide over an end section of the first portion 36 of the storage container 14 until engaging with the groove 42 thereof. The engagement between the lip 40 and the groove 42 holds the first portion 36 in contact with the second portion 38 of the storage container 14. In other words, the lip and groove engagement described herein holds the lid closed on the storage container 14.

The storage container 14 may also comprise a tab 44 or flange extending from the second portion 38 or lid of the storage container 14. A hole 46 may be formed through the tab 44 for hanging the storage container 14 therefrom. Furthermore, the tab 44 may be configured to be attached to the second portion 38 at the closed end thereof by a living hinge or line of weakness 48 such that the tab 44 may pivot relative to the second portion of the storage container 14. In some embodiments of the invention, the tab 44 may be configured to fold down into a recess 50 or cavity formed into the closed end of the second portion 38.

The cleaning tool 16, as illustrated in FIGS. 4-6, may comprise a handle 52 and an end fixture 54. The cleaning tool 16 may be, for example, a long-handled brush, boat deck brush, sponge mop, squeegee, broom, or any other similar cleaning tool with an elongated and/or extendible handle. The handle 52 may be any elongated, rigid structure sized and configured to fit within the pole opening of the drying cloth 12. The end fixture 54 may be a brush, squeegee blade, or any typical cleaning tool end fixture. Alternatively, the cleaning tool 16 may be specifically designed for use with the drying cloth 12 and its end fixture 54 may be sized and shaped to fit within the drying cloth 12. The end fixture 54 may be substantially larger than the pole opening 22, such that when the end fixture 54 is within the drying cloth 12, it will not slide out through the pole opening 22.

In use, the drying cloth 12 may be placed over the end fixture 54 of the cleaning tool 16. Specifically, the openable seam 24 may be placed in its unattached configuration, as illustrated in FIGS. 3 and 4, to allow the drying cloth 12 to easily slide over the end fixture 54 at the second opening 20. The opening formed between the first and second seam edges 26,28 allows the handle 52 of the cleaning tool 16 to slide therethrough, from the second opening 20 to the pole opening 22. Once the handle 52 is positioned at the pole opening 22, the openable seam 24 may be placed in its attached configuration, as illustrated in FIGS. 5 and 6. Then a user may grip the handle 52 and use it to rub, sweep, and/or swipe the drying cloth 12 along a vehicle or structure, as noted above. The drying cloth 12 is loose relative to the end fixture 54 and can therefore conform to various surfaces having varying angles, curvatures, protrusions, and cavities of the vehicle or structure being cleaned, dried, and/or polished thereby, without being confined to the physical limitations of the end fixture's specific configuration.

Figure 7:
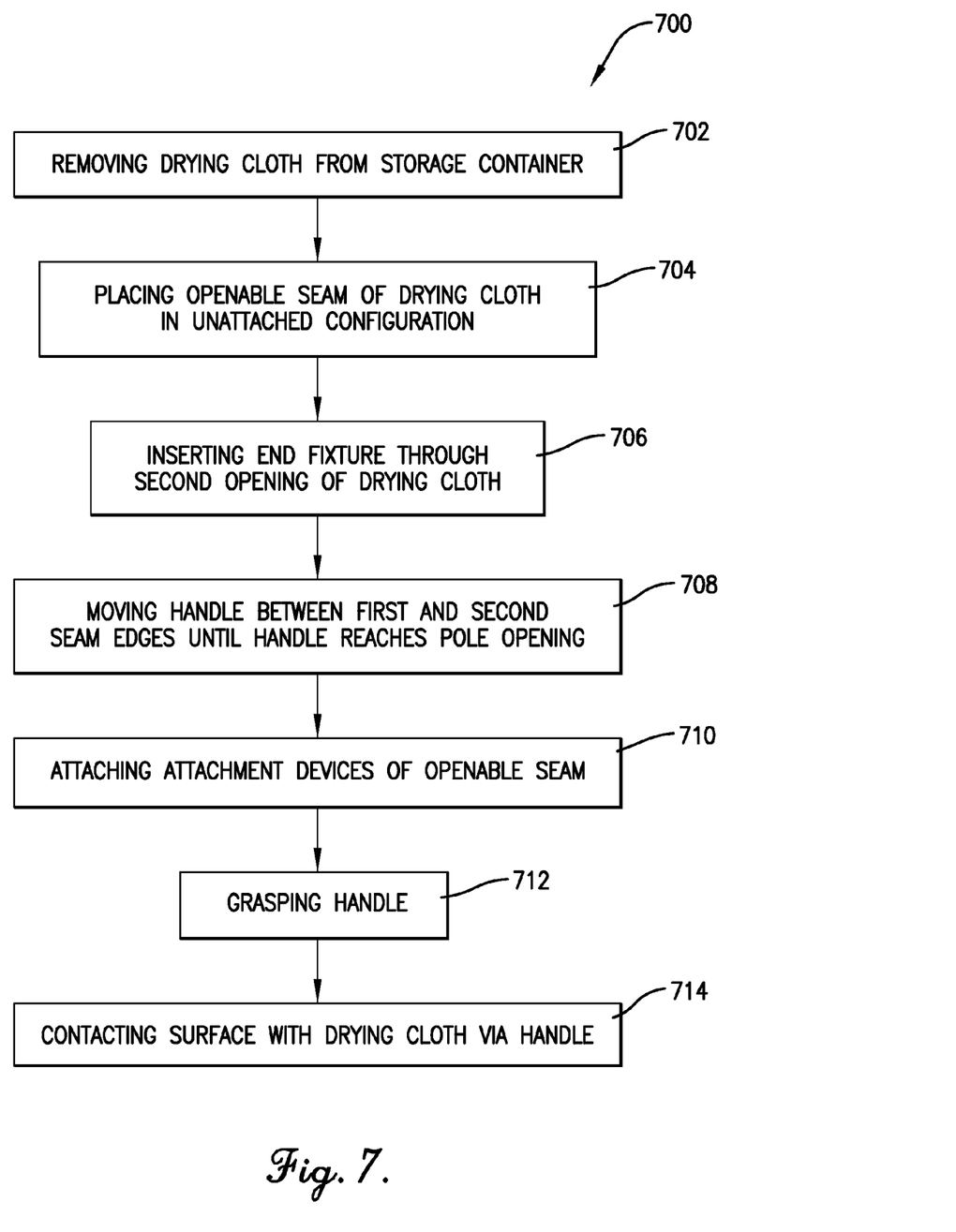
FIG. 7 is a flow chart illustrating a method of cleaning, drying, and/or polishing a vehicle or other structure in accordance with an embodiment of the present invention.

The flow chart of FIG. 7 depicts the steps of an exemplary method 700 for cleaning, drying, and/or polishing a vehicle or structure. In some alternative implementations, the functions noted in the various blocks may occur out of the order depicted in FIG. 7. For example, two blocks shown in succession in FIG. 7 may in fact be executed substantially concurrently, or the blocks may sometimes be executed in the reverse order depending upon the functionality involved.

The method 700, illustrated in FIG. 7, may first include the step of removing the drying cloth 12 from the storage container 14, as depicted in block 702. This step may include removing the second portion 38 from the first portion 36 by pulling the first and second portions 36,38 away from each other, thereby disengaging the lip 40 from the groove 42. Next, the method 700 may comprise the step of placing the openable seam 24 of the drying cloth 12 in the unattached configuration, as depicted in block 704, by disengaging the attachment devices 30 from each other. Specifically, this step may include unzipping a zipper, pulling VELCRO or snaps apart or away from each other, or removing buttons from button holes or loops of the drying cloth 12, such that the first and second seam edges 26,28 are pulled away from each other. The method 700 may then include the steps of inserting the end fixture 54 through the second opening 20 of the drying cloth 12, as depicted in block 706, and moving the handle 52 between the first and second seam edges 26,28 until it reaches the pole opening 22, as depicted in block 708. The method 700 may then include the step of attaching the attachment devices 30 of the openable seam 24, as depicted in block 710, such that the openable seam 24 is in the attached configuration, as illustrated in FIG. 5. Once this step is completed, the handle 52 extends through the pole opening 22 and the end fixture 54 resides within the drying cloth 12 between the first and second openings 18,20.

The method 700 may then include the steps of grasping the handle 52, as depicted in block 712, and contacting a surface with the drying cloth 12 via the handle 52, as depicted in block 714. For example, a user may grasp the handle 52 and wipe the drying cloth 12 against an angled surface or corner of a boat. The over-sized dimensions of the drying cloth 12, which are generally larger than the dimensions of the end fixture 54, are such that the drying cloth 12 can be manipulated side-to-side and/or rotated in use, providing additional absorbent material for drying large surface areas without the need for changing or wringing the cloth.

Although the invention has been described with reference to the particular embodiments, it is noted that equivalents may be employed and substitutions made herein without departing from the scope of the invention.

Having thus described various embodiments of the invention, what is claimed as new and desired to be protected by Letters Patent includes the following:

1. A drying cloth comprising:
   a piece of absorbent fabric wrapped or sewn to form a flexible shell with a hollow center and first and second openings formed at opposing ends of the absorbent fabric, wherein the piece of absorbent fabric has an inner surface and an outer surface, wherein both the inner and outer surfaces of the piece of absorbent fabric are absorbent;
   a pole opening formed through the shell mid-way between and spaced a distance apart from the first opening and the second opening;
   a first seam edge and a second seam edge formed in the shell and extending between the pole opening and the second opening to cooperatively form an openable seam having a closed configuration and an open configuration, wherein, in the closed configuration, the first and second seam edges are attached to each other, such that the pole opening is separated from the second opening by the openable seam; and
   one or more attachment devices fixed at or proximate to at least one of the first seam edge and the second seam edge and configured to detachably attach the first seam edge with the second seam edge for securing the shell around an end fixture of a cleaning tool and securing an elongated handle of the cleaning tool within the pole opening by placing the openable seam in the closed configuration.

2. The drying cloth of claim 1, wherein the absorbent fabric is at least one of micro-fiber cloth, natural chamois material, and synthetic chamois material.

3. The drying cloth of claim 1, wherein the attachment devices comprise at least one of hook tape, loop tape, zippers, buttons, button loops, button holes, and snaps.

4. The drying cloth of claim 1, wherein the shell has an elongated cylindrical configuration.

5. The drying cloth of claim 1, wherein the pole opening is sized and configured such that a handle of a long-handled brush, boat deck brush, sponge mop, squeegee, or broom fits therethrough.

6. The drying cloth of claim 1, wherein the drying cloth is large enough to fit over an end fixture of at least one of a long-handled brush, boat deck brush, sponge mop, squeegee, and broom.

7. A drying system configured for drying a vehicle, the drying system comprising:
   a drying cloth including:
   a piece of absorbent fabric wrapped or sewn to form a flexible shell with a hollow center and first and second openings, wherein the piece of absorbent fabric has an inner surface and an outer surface, wherein both the inner and outer surfaces of the piece of absorbent fabric are absorbent,
   a pole opening formed through the shell at a half-way point between the first opening and the second opening,
   a first seam edge and a second seam edge formed in the shell between the pole opening and the second opening to cooperatively form an openable seam configured to be placed in an attached configuration and an unattached configuration, and
   one or more attachment devices fixed at or proximate to at least one of the first seam edge and the second seam edge and configured to detachably attach the first seam edge with the second seam edge when the openable seam is in the attached configuration; and a cleaning tool having an elongated handle and an end fixture attached thereto, wherein the elongated handle is sized to fit through the pole opening, the shell is sized to fit over the end fixture, and the attachment devices are configured to attach the shell over the end fixture and to secure the elongated handle within the pole opening.

8. The drying system of claim 7, wherein the absorbent fabric is at least one of micro-fiber cloth, natural chamois material, and synthetic chamois material.

9. The drying system of claim 7, wherein the attachment devices comprise at least one of hook tape, loop tape, zippers, buttons, button loops, button holes, and snaps.

10. The drying system of claim 7, wherein the shell has an elongated cylindrical configuration.

11. The drying system of claim 7, wherein the cleaning tool is at least one of a long-handled brush, boat deck brush, sponge mop, squeegee, and broom.

12. The drying system of claim 7, wherein the shell is sized such that the openable seam must be in the unattached configuration in order to be placed over the end fixture of the cleaning tool.

13. The drying system of claim 12, wherein the shell is securable to the cleaning tool by placing the openable seam in the attached configuration after the shell is placed over the end fixture of the cleaning tool, such that the elongated handle extends through the pole opening.

14. The drying system of claim 12, further comprising a storage container having a hollow, substantially cylindrical configuration with a first closed end, a second closed end, and one flattened surface extending between the first and second closed ends, wherein the storage container is separatable into a first portion and a second portion configured to detachably attach to the first portion, wherein the storage container is sized to store the drying cloth therein.

15. A drying system comprising:
a drying cloth including:
a piece of absorbent fabric wrapped or sewn to form a flexible shell with a hollow center and first and second openings,
a pole opening formed through the shell mid-way between the first opening and the second opening,
a first seam edge and a second seam edge formed in the shell between the pole opening and the second opening to cooperatively form an openable seam configured to be placed in an attached configuration and an unattached configuration, and
one or more attachment devices fixed at or proximate to at least one of the first seam edge and the second seam edge and configured to detachably attach the first seam edge with the second seam edge when the openable seam is in the attached configuration;
a cleaning tool having an elongated handle and an end fixture attached thereto, wherein the elongated handle is sized to fit through the pole opening, the shell is sized to fit over the end fixture, and the attachment devices are configured to attach the shell over the end fixture and to secure the elongated handle within the pole opening; and
a storage container having a hollow, substantially cylindrical configuration with a first closed end, a second closed end, and one flattened surface extending between the first and second closed ends, wherein the storage container is separatable into a first portion and a second portion configured to detachably attach to the first portion, wherein the storage container is sized to store the drying cloth therein.

16. The drying system of claim 15, wherein the absorbent fabric is at least one of micro-fiber cloth, natural chamois material, and synthetic chamois material.

17. The drying system of claim 15, wherein the attachment devices comprise at least one of hook tape, loop tape, zippers, buttons, button loops, button holes, and snaps.

18. The drying system of claim 15, wherein the shell has an elongated cylindrical configuration.

19. The drying system of claim 15, wherein the cleaning tool is at least one of a long-handled brush, boat deck brush, sponge mop, squeegee, and broom.

20. The drying system of claim 15, wherein the shell is sized such that the openable seam must be in the unattached configuration in order to be placed over the end fixture of the cleaning tool.

21. The drying system of claim 15, wherein the shell is securable to the cleaning tool by placing the openable seam in the attached configuration after the shell is placed over the end fixture of the cleaning tool, such that the elongated handle extends through the pole opening.

\* \* \* \* \*